United States Patent
Song

(10) Patent No.: US 10,213,981 B2
(45) Date of Patent: Feb. 26, 2019

(54) COMPOSITE PART WITH INSERTED METAL PLATE AND MANUFACTURING METHOD OF THE SAME

(71) Applicant: HYUNDAI MOTOR COMPANY, Seoul (KR)

(72) Inventor: Won Ki Song, Guri-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/372,585

(22) Filed: Dec. 8, 2016

(65) Prior Publication Data

US 2018/0099474 A1 Apr. 12, 2018

(30) Foreign Application Priority Data

Oct. 12, 2016 (KR) ........................ 10-2016-0132219

(51) Int. Cl.
| | | |
|---|---|---|
| *B32B 3/04* | (2006.01) | |
| *B32B 3/26* | (2006.01) | |
| *B32B 3/30* | (2006.01) | |
| *B32B 5/02* | (2006.01) | |
| *B32B 15/14* | (2006.01) | |

(52) U.S. Cl.
CPC ................ *B32B 3/04* (2013.01); *B32B 3/266* (2013.01); *B32B 3/30* (2013.01); *B32B 5/02* (2013.01); *B32B 15/14* (2013.01); *B32B 2250/02* (2013.01); *B32B 2260/021* (2013.01); *B32B 2260/046* (2013.01)

(58) Field of Classification Search
CPC ......................................................... B32B 3/04
USPC ......................................................... 428/125
See application file for complete search history.

(56) References Cited

FOREIGN PATENT DOCUMENTS

| JP | 2003305775 | | 10/2003 |
|---|---|---|---|
| JP | 2003305775 A | * | 10/2003 |
| JP | 2010030298 | | 2/2010 |
| JP | 2011080512 A | | 4/2011 |
| KR | 20130096232 A | | 8/2013 |
| KR | 20130134758 A | | 12/2013 |

OTHER PUBLICATIONS

Translation of JP-2003305775-A, Kimura, Kiminori, Oct. 2003 (Year: 2003).*

* cited by examiner

*Primary Examiner* — Brent T O'Hern
(74) *Attorney, Agent, or Firm* — McDonnell Boehnen Hulbert & Berghoff LLP

(57) ABSTRACT

Disclosed is a composite part with an inserted metal plate, the composite part including: a first metal plate; a sheet of reinforced fiber layer folded around the metal plate; a first connection hole disposed in the reinforced fiber layer and exposing a section of the metal plate; and a resin impregnating the reinforced fiber layer and integrally adhering the first plate and the reinforced fiber layer.

13 Claims, 9 Drawing Sheets

COMPOSITE PART WITH INSERTED METAL PLATE AND MANUFACTURING METHOD OF THE SAME

CROSS REFERENCE TO RELATED APPLICATION

The present application claims priority to Korean Patent Application No. 10-2016-0132219, filed Oct. 12, 2016, the entire contents of which is incorporated herein for all purposes by this reference.

BACKGROUND OF THE INVENTION

Field of the Invention

The present invention generally relates to a composite part with an inserted metal plate, comprising a metal plate covered by a reinforced fiber layer, wherein a section of the metal plate is exposed by a through hole in the reinforced fiber layer allowing the metal plate to more easily be welded with a second metal part.

Description of the Related Art

Composite parts made of a composite material including a reinforced fiber and a resin can be connected to metal parts by affixing a metal plate to the composite part and then welding the metal plate to the metal part. Typically, the metal plate is connected with the composite part by using an adhesive, or a welding tab is created by inserting a metal plate into the composite part.

In these configurations, however, when an end portion of the metal affixed to the composite material is connected with a metal part, a discontinuity is formed at the boundary between the reinforced fiber and the metal part, and the binding force between the composite part and the metal part may be insufficient to withstand a force such as an impact. When an external force is applied to the composite and metal part, the adhesive layer connecting the composite and the metal part may be damaged, causing the metal part to detach from the composite part.

The foregoing is intended merely to aid in the understanding of the background of the present invention, and is not intended to mean that the present invention falls within the purview of the related art that is already known to those skilled in the art.

SUMMARY OF THE INVENTION

The present disclosure provides a composite part with an inserted metal plate that is particularly advantageous for welding to other metal parts, wherein a metal plate is covered with a reinforced fiber layer, and a section of the metal plate is exposed through a connecting hole in the reinforced fiber layer allowing the metal plate to easily be welded to another metal part.

In an example embodiment, the present disclosure provides a composite part with an inserted metal plate, comprising: a first metal plate; a reinforced fiber layer folded around it the metal plate; a connection hole extending through the reinforced fiber layer and exposing a predetermined section of the metal plate; and a resin impregnating the reinforced fiber layer and integrally adhering the first plate and the reinforced fiber layer.

The reinforced fiber layer may include: a first section having an inner surface in contact with a first surface of the metal plate; a second section having an inner surface in contact with a second surface of the metal plate; and a fold between the first section and the second section.

The connection hole may extend through the first section of the reinforced fiber layer to expose a corresponding section of the metal plate.

And end of the metal plate may be in contact with an inner surface of the fold, and thus at least three surfaces of the metal plate are in contact with the reinforced fiber layer.

Portions of the inner surfaces of the first section and the second section of the reinforced fiber layer that are not in contact with the metal plate may be connected together to enclose the metal plate.

The metal plate may include a stepped section protruding toward the connecting hole. The second section of the reinforced fiber layer may include a blocking hole configured as a through hole at a position corresponding to the position of the connecting hole.

A surface of the stepped section may be coplanar with an outer surface of the first section of the reinforced fiber layer.

In further example embodiments, the metal plate may further include a hem section at an end thereof that is contact with the first fold. The hem section may be formed by rolling the end of the first plate.

In further example embodiments, the metal plate may include a bent section bent towards the first section of the reinforced fiber layer at an end thereof that is in contact with the first fold, such that the inner surface of the first section is in contact with both the first surface and the second surface of the first plate.

In further example embodiments, the reinforced fiber layer may include: a first extended section bent downward and extending from an end of the second section; a second extended section disposed such that an inner surface thereof faces an inner surface of the first extended section; and a second fold between the first and second extended sections. In this embodiment, a second metal plate is inserted into the composite part such that the second metal plate is covered by the first and second extended sections and the second fold, and the first extended section further comprises a second connection hole exposing a section of the second metal plate.

A method of manufacturing a composite part with an inserted metal plate according to an example embodiment of the present disclosure includes the steps of: arranging a reinforced fiber layer having a first connection hole configured as a through hole within a mold; inserting a first metal plate into the mold so that a predetermined section of the metal plate corresponds to the position of the first connection hole; folding the reinforced fiber layer around the metal plate; and closing the mold and injecting a resin into the mold.

In additional example embodiments, the first metal plate may further comprise a stepped section protruding into the first connection hole. The mold comprises an upper mold section and lower mold section and packing parts positioned to correspond to the location of the stepped section protruding into the first connection hole. When the mold is closed, the stepped section of the first metal plate is pressurized between the packing parts. Resin is then injected from the sides of the mold and cured.

In a further example embodiment, the reinforced fiber layer further comprises a second connection hole. A second metal plate may be positioned so that a predetermined section of the second metal plate is exposed by the second connecting hole. The reinforced fiber layer may be folded inside the mold by moving a sliding core from one side to the opposite side of the mold.

As described above, in the composite part with the inserted metal plate according to the present disclosure, the metal plate to be welded has surfaces covered with and to the reinforced fiber layer. As a result, in case of the application of an external force such as an impact, damage caused by stress focused on an end of the first plate may be avoided.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
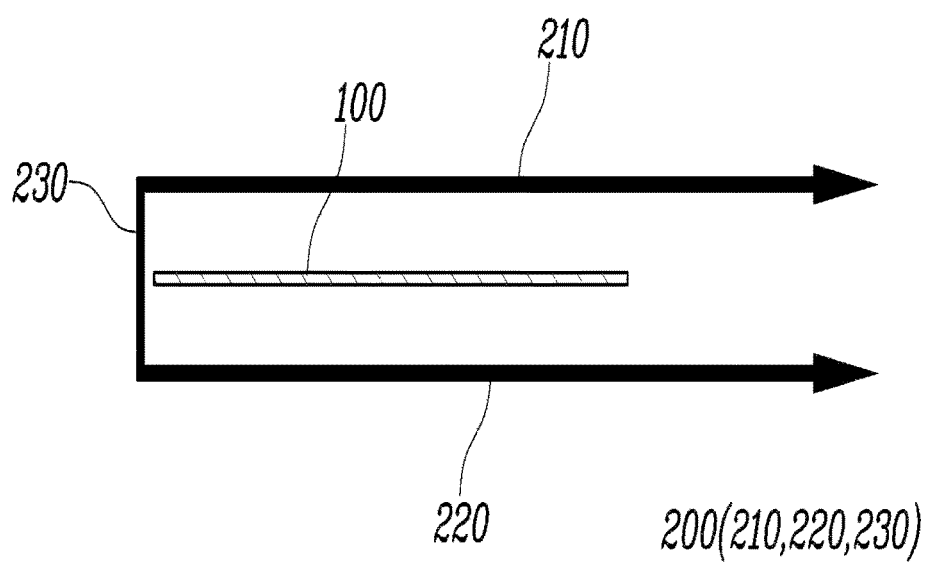
FIG. 1 is a schematic cross-sectional view of an example embodiment of a composite part with an inserted metal plate.

Example embodiments of the present invention are described in detail below with reference to the accompanying drawings. Throughout the drawings, the same reference numerals will refer to the same or like parts.

Figure 2:
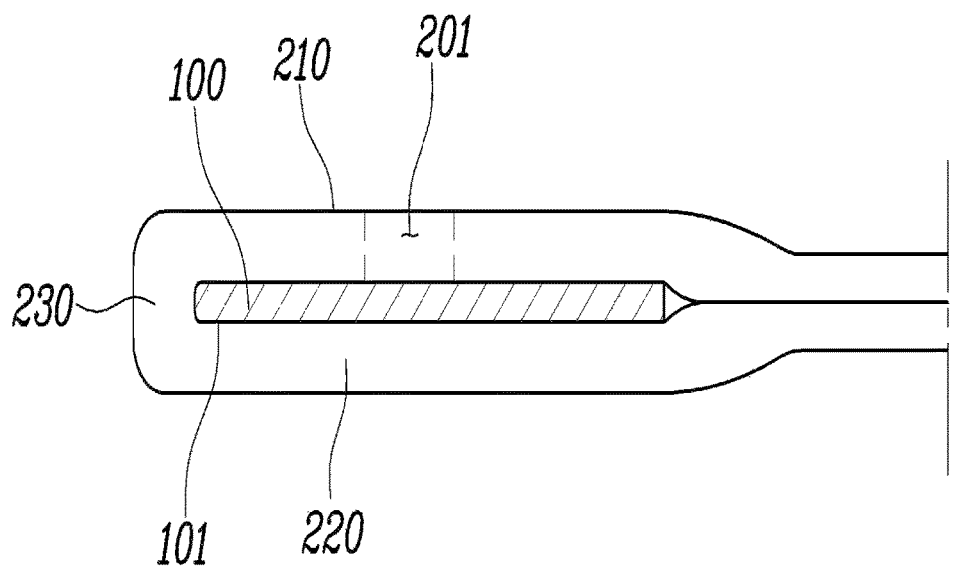
FIG. 2 is a cross-sectional view of an example embodiment of a composite part with an inserted metal plate.

As shown in FIGS. 1 and 2, in an example embodiment, a composite part with an inserted metal plate includes: a first metal plate 100; a reinforced fiber layer 200 folded around first metal plate 100; a first connection hole 201 extending through reinforced fiber layer 200 and exposing a predetermined section of first metal plate 100; and a resin impregnating the reinforced fiber layer 200 and integrally adhering first metal plate 100 and reinforced fiber layer 200.

First metal plate 100 may be made of a material such as steel, aluminum, or magnesium. Those of skill in the art will recognize that other materials may also be used for first metal plate as appropriate for the use of the composite part. First metal plate 100 has a first and second surface and a predetermined thickness.

Reinforced fiber layer 200 is a sheet made of a reinforced fiber. In an example embodiment, reinforced fiber layer 200 is made by stacking continuous fibers having regular array directions or by stacking woven fibers. In a preferred embodiment, reinforced fiber layer 200 is made by stacking continuous fibers having a regular array direction in different directions. Reinforced fiber layer 200 may be selected from one or more of a carbon fiber, a glass fiber, an aramid fiber, and a natural fiber. However, those of skill in the art will recognize that other types of fibers amy be used to form reinforced fiber layer 200.

Reinforced fiber layer 200 is folded around and covers a portion of first metal plate 100. Accordingly, both the first and second surfaces of first metal plate 100 are in contact with reinforced fiber layer 200. In addition, reinforced fiber layer 200 may be connected to first metal plate 100 by wrapping the first metal plate 100.

First connection hole 201 extends through a section of the reinforced fiber layer 200, exposing a predetermined section of first metal plate 100. Because the predetermined section of first metal plate 100 is exposed, the first metal plate 100 may be connected with a metal part 500 by being welded through first connection hole 201.

A resin is introduced that impregnates the reinforced fiber by filling in gaps between fibers in the reinforced fiber layer 200. The resin also integrally adheres first metal plate 100 and reinforced fiber layer 200 by coating the surfaces of the first metal plate 100 and being cured. In example embodiments, the resin may be a thermoplastic resin or a thermosetting resin.

Because the first metal plate is covered by the reinforced fiber layer on two surfaces, rather than just having the reinforced fiber layer adhered to a single surface, the composite part is better able to withstand the force associated with an impact and better able to avoid separation of the metal plate from the reinforced fiber layer.

In one example embodiment, first metal plate 100 may include a through hole that passes through both surfaces thereof, and the resin impregnates the reinforced fiber layer 200, fills in the through hole and is cured therein. First metal plate 100 and reinforced fiber layer 200 are integrally adhered to each other by the resin, and the binding force between first metal plate 100 and reinforced fiber layer is increased.

In a further example embodiment, reinforced fiber layer 200 may be folded to create a first section 210 having a surface in contact with the first surface of first metal plate 100, a second section 220 having a surface in contact with a second surface of first metal plate 100, and a fold 230 between first section 210 and second section part 220.

First connection hole 201 extends through first section 210 of reinforced fiber layer 200 exposing a predetermined section of the first surface of first metal plate 100. In addition, an end of first metal plate 100 may contact an inner surface of fold 230, resulting in at least three surfaces of first metal plate 100 being in contact with reinforced fiber layer 200. Therefore, first metal plate 100 and reinforced fiber layer 200 are strongly connected with each other due to the increased contact area.

The portions of the inner surfaces of first section 210 and second section 220 that do not contact first metal plate 100 may be connected together as shown in FIG. 2.

In a further example embodiment, first metal plate 100 may include a stepped section 110 that protrudes into first connecting hole 201, and second section 220 of reinforced fiber layer 200 may include a blocking hole configured as a through hole at a position corresponding to the position of the first connecting hole 201.

As described above, the section of the first metal plate 100 exposed by first connection hole 201 allows first metal plate 100 to be connected to a metal part 500, including by welding first metal plate 100 to metal part 500. Therefore, the composite part may be easily connected with metal part 500 without any interference because the part of the first metal plate 100 to be welded protrudes into the first connection hole 201.

To facilitate welding, first metal plate 100 may further include a stepped section 110 protruding into first connection hole 201. Second section 220 of reinforced fiber layer 200 may include a blocking hole configured as a through hole at a position corresponding to the position of first connecting hole 201. Accordingly, stepped section 110 of first metal plate 100 is exposed by both the first connection hole 201 the blocking hole.

The blocking hole may prevent inflow of the resin to the stepped section 110 of first metal plate 100 through first connection hole 201 such that only reinforced fiber layer 200 is impregnated with resin. This prevents the outer surface of stepped section 110 from being coated with the resin, which will hinder welding of first metal plate 100 and metal part 500.

In a further example embodiment, one surface of stepped section 110 is coplanar with an outer surface of first section 210 of reinforced fiber layer 200.

Figure 3:
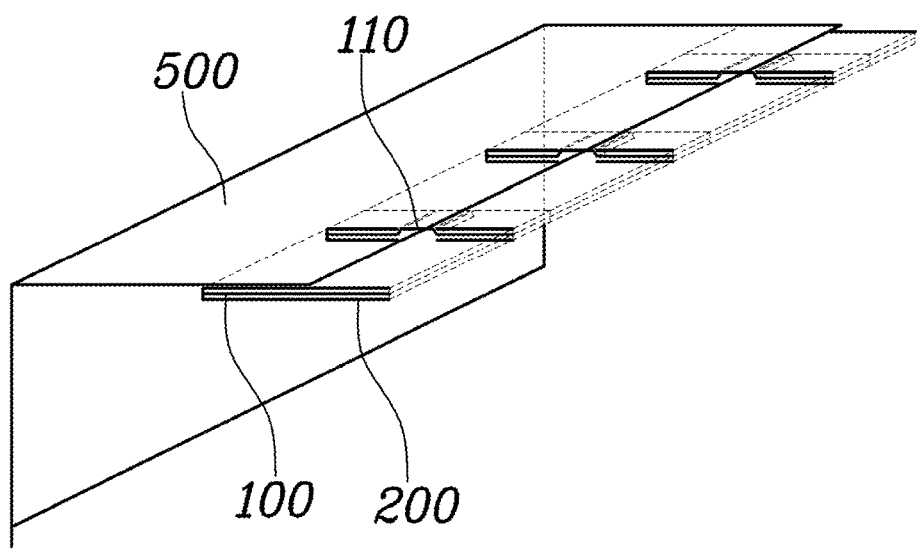
FIG. 3 is a view showing a connection between an example embodiment of the composite part with the inserted metal plate and a metal part.

As shown in FIG. 3, stepped section 110 may protrude into first connection hole 201 so that the one surface of the stepped section 110 is coplanar with an outer surface of the first section 210. This allows the composite part to be easily welded with metal part 500. Reinforced fiber layer 200 may then be disposed between a surface of metal part 500 to be welded and first metal plate 100, providing a stable connection between first metal plate 100 and metal part 500.

Figure 4:
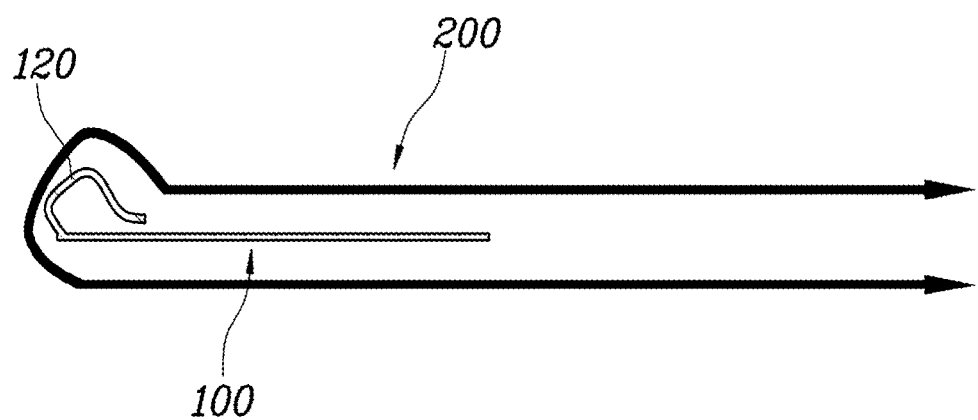
FIG. 4 is a schematic cross-sectional view of an example embodiment of a composite part with an inserted metal plate having a hem section formed therein.

Referring to FIG. 4, in a further example embodiment, first metal plate 100 may include with a hem section 120 at one end that is contact with first fold 230. In an example embodiment, hem section 120 is formed by rolling the end of first metal plate 100. Use of the hem section assists in avoiding damage caused by the force of an impact. In addition, the contact area between first metal plate 100 and inner surface of the first section 210 is increased by hem section 120, thereby increasing the binding force between them.

In addition, hem section 120 may help minimize the stress focused in the end of the first metal plate 100. Damage to the reinforced fiber layer at the first fold 230 is caused by the first metal plate 100 when the composite part receives impact energy may be avoided due to the tensile force generated in the reinforced fiber.

Figure 5:
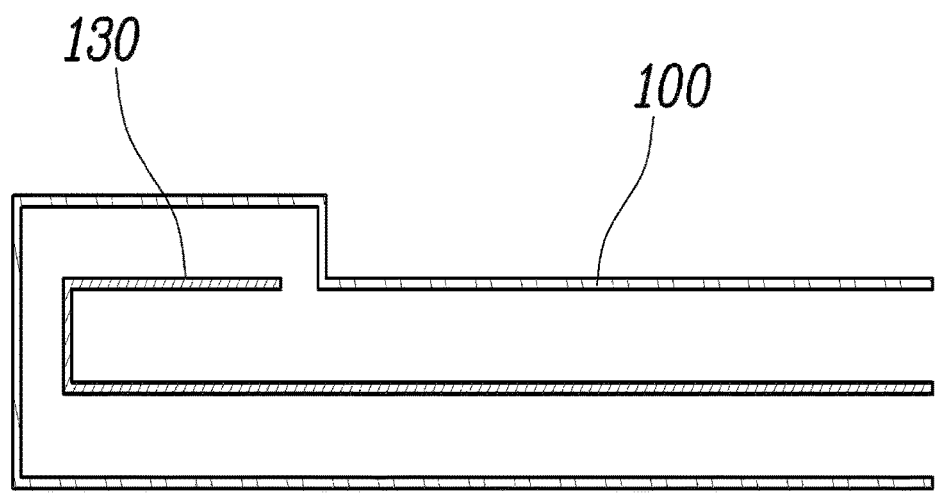
FIG. 5 is a schematic cross-sectional view of an example embodiment of a composite part with an inserted metal plate having a bent section formed therein.
Figure 6:
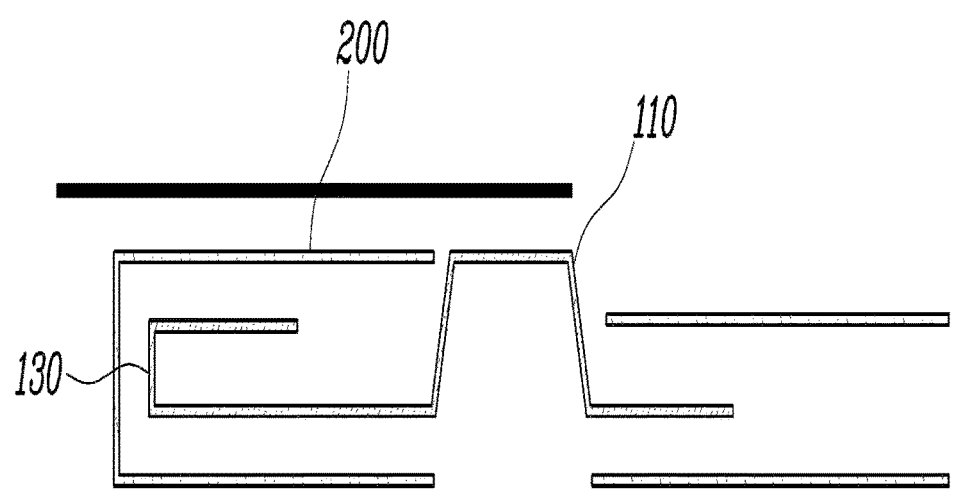
FIG. 6 is a schematic cross-sectional view of an example embodiment of a composite part with an inserted metal plate having a bent section and a stepped section formed therein.

Referring to FIGS. 5 and 6, in a further example embodiment, first metal plate 100 may include a bent section 130 bent towards first section 210 at an end in contact with first fold 230, such that the inner surface of first section 210 is in contact with both the first surface and the second surface of first metal plate 100. As with hem section 120, bent section 130 assists in avoiding damage caused by application of force such as an impact in an end of first metal plate 100. In addition, the contact area between first metal plate 100 and the inner surface of first section 210 is increased by bent section 130, thereby increasing the binding force between first metal plate 100 and reinforced fiber layer 200. In this configuration, the inner surface of first section 210 is in contact with both the first surface and the second surface of first metal plate 100 at the same time.

Figure 7:
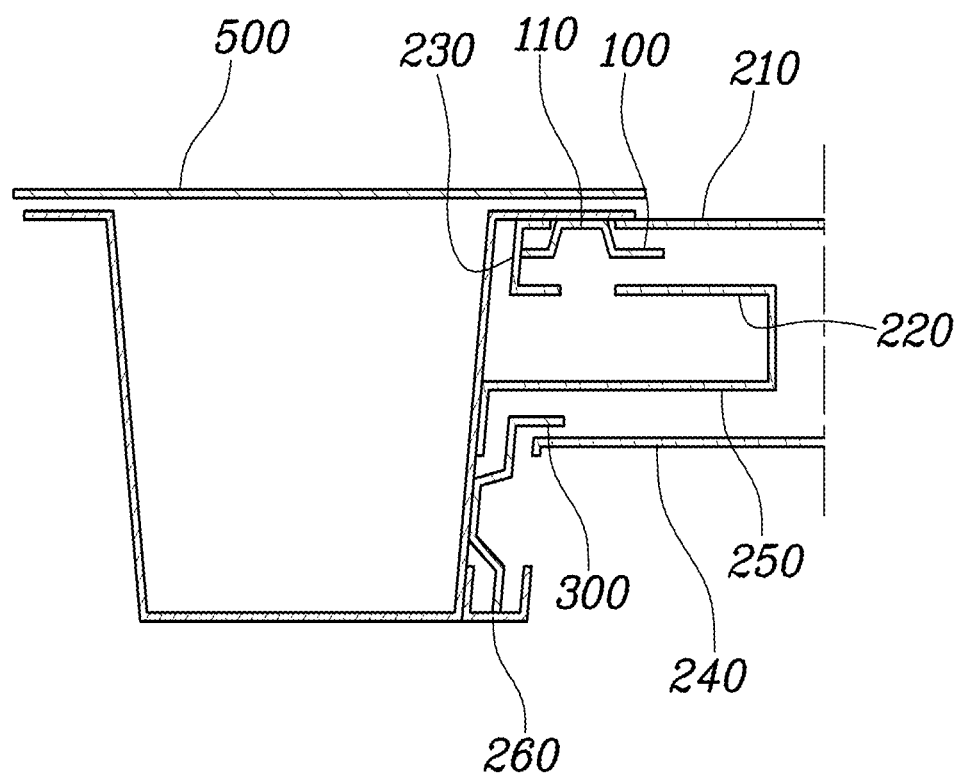
FIG. 7 is a schematic view showing a connection between an example embodiment of a composite part with two inserted metal plates and a metal part.

Referring to FIG. 7, in a further example embodiment, reinforced fiber layer 200 includes a first extended section 240 bent downward and extending from an end of second section 220, a second extended section 250 disposed such that an inner surface thereof faces an inner surface of first extended section 240, and a second fold 260 connecting first extended section 240 and second extended section 250. A second metal plate 300 is positioned such that second metal plate 300 is covered with the first and second extended sections 240 and 250, and the second fold 260. A second connection hole is disposed in first extended section 240, thereby exposing a section of the second metal plate 300.

First extended section 240 is bent downward and extends from an end of the second section 220. Second extended section 250 faces first extended section 240 and is disposed such that an inner surface thereof faces an inner surface of the first extended section 240. Second fold 260 connects first extended section 240 and second extended section 250.

In example embodiments, second metal plate 300 may be composed of materials such as steel, aluminum, and magnesium. Those of skill in the art will recognize that other materials could be used for second metal plate. Second metal plate 300 has a first and second surface and a predetermined thickness.

Second metal plate 300 is covered with first extended section 240, second extended section 250, and second fold 260. Preferably, an end surface of second metal plate 300 is in contact with the inner surface of second fold 260, resulting in three surfaces of the second metal plate 300 being in contact with reinforced fiber layer 200. Second metal plate 300 and reinforced fiber layer 200 are strongly connected to each other due to the increased contact area between them.

First extended section 240 includes a second connection hole configured as a through hole, exposing a section of second metal plate 300. Because the section of second metal plate 300 is exposed, the second metal plate 300 may be connected with metal part 500 by being welded through the second connection hole.

The resin impregnates first extended section 240, second extended section 250, and second fold 260 of reinforced fiber layer 200 by filling the gaps formed in the reinforced fiber. At the same time, the resin integrally connects the second metal plate 300 and the reinforced fiber layer 200 by coating surfaces of second metal plate 300 and being cured. A thermoplastic resin or a thermosetting resin may be used as the resin.

The disposition direction of the second metal plate 300 may differ from that of first metal plate 100 due to bending of the reinforced fiber layer 200 to form the first and second extended sections 240 and 250, respectively.

Thus, in an example embodiments when metal part 500 has a welding face in a vertical direction, or a welding face in a horizontal direction, the first metal plate 100 may be welded with the welding face formed in the horizontal direction through first connection hole 201, and the second metal plate 300 may welded with the welding face formed in the vertical direction through the second connection hole. Thus, the composite part with the inserted metal plate of the present invention is stably connected with metal part 500.

Figure 8:
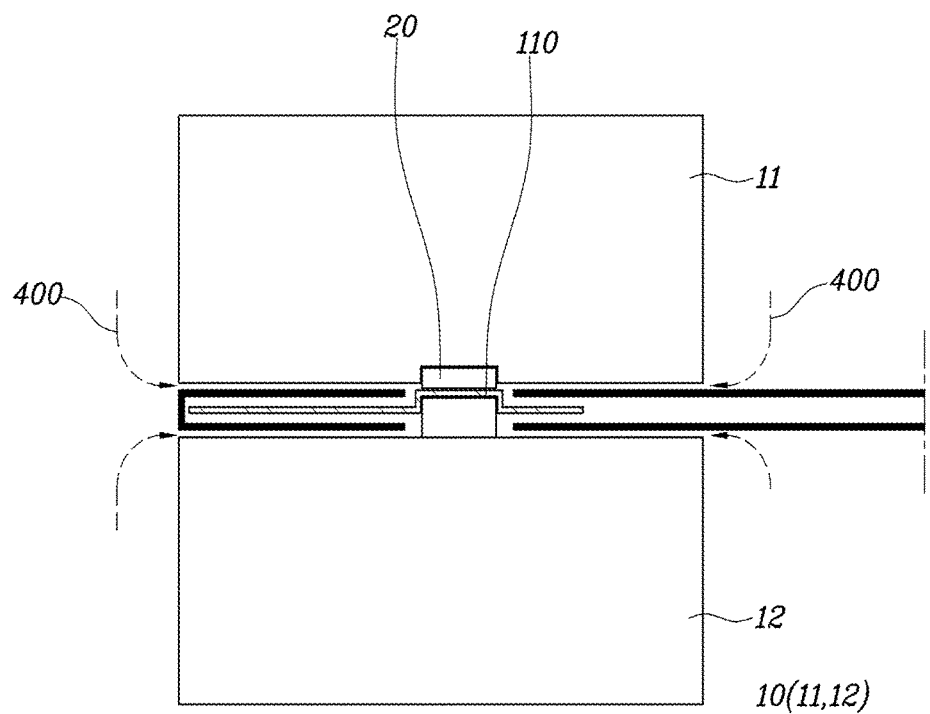
FIG. 8 is a view showing a process for manufacturing an example embodiment of a composite part with an inserted metal plate.

As shown in FIG. 8, a method of manufacturing a composite part with an inserted metal plate according to the present disclosure includes: arranging a reinforced fiber layer 200 having a first connection hole 201 configured as a through hole within mold 10; inserting first metal plate 100 into mold 10 at a position in which first connection hole 201 is formed; folding reinforce fiber layer 200 such that first metal plate 100 is covered by reinforced fiber layer; and forming the composite part by closing mold 10 and injecting a resin into mold 10.

In an example embodiment, resin 400 may be injected into mold 10 under high temperature and high pressure such that gaps formed in the reinforced fiber are minimized.

Mold 10 may comprise be provided with packing parts in an upper mold section 11, a lower mold section and packing parts that may be positioned between the upper and lower mold sections 11 and 12 respectively. When the first metal plate 100 includes a stepped section 110, the packing parts 20 may be positioned to correspond to the position of first connection hole 201. When mold 10 is closed, stepped section 110 of first metal plate 100 may be pressurized by the packing parts 20. Resin 400 may be injected at both sides of the mold. Packing parts 20 then prevent inflow of the resin 400 to stepped section 110 by pressurizing the position of first metal plate 100 in which the stepped section 110 is formed. In this example, only the reinforced fiber is impregnated by the resin 400; the surface of stepped section 110 will not be coated with resin, and, therefore, welding between the first metal plate 100 and metal part 500 will not be hindered by the resin.

Figure 9:
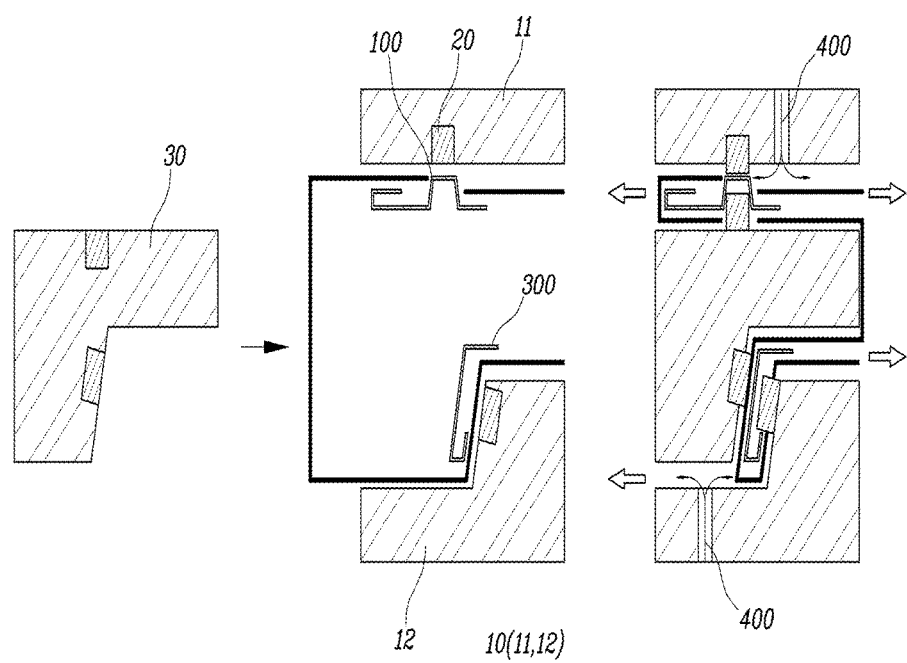
FIG. 9 is a view showing a manufacturing process for an example embodiment of a composite part with an inserted metal plate using a sliding core.

Referring to FIG. 9, preferably, in a further example embodiment, reinforced fiber layer 200 may further comprise a second connection hole. A second metal plate 300 may be inserted and the first and second extensions of reinforced fiber layer 200 may be folded around second metal plate 300 by by moving a sliding core 30 from one side to the opposite side of the mold 10. The mold 10 may then be closed to form the composite part.

The second connection hole for second metal plate 300 may be disposed in reinforced fiber layer 200. Sliding core 30 may move from one side to the opposite side, folding reinforced fiber layer 200 to wrap first metal plate 100 and second metal plate 300. Parts of first metal plate 100 and second metal plate 300 may be exposed through the first and second connection holes.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A composite part with an inserted metal plate, the composite part comprising:
a metal plate having first and second surfaces;
a reinforced fiber layer folded around the metal plate;
a first connection hole extending through the reinforced fiber layer and exposing a section of the first surface of the metal plate; and
a resin impregnating the reinforced fiber layer and integrally connecting the metal plate and the reinforced fiber layer,
wherein the reinforced fiber layer comprises:
a first section having an inner surface in contact with the first surface of the metal plate;
a second section having an inner surface in contact with the second surface of the metal plate; and
a fold between the first and second sections;
wherein portions of the inner surfaces of the first section and the second section of the reinforced fiber layer that are not in contact with the metal plate contact each other.

2. The composite part of claim 1, wherein the first connection hole extends through the first section of the reinforced fiber layer and exposes a section of the first surface of the metal plate.

3. The composite part of claim 1, wherein the metal plate further comprises an end in contact with an inner surface of the fold.

4. The composite of claim 1, wherein the inner surfaces of the first and second sections contact each other.

5. The composite part of claim 1, wherein the metal plate further comprises a stepped section.

6. The composite part of claim 5, wherein the stepped section protrudes into the first connecting hole.

7. The composite part of claim 6, wherein the second section of the reinforced fiber layer further comprises a through hole at a position corresponding to the position of the first connecting hole in the first section of the reinforced fiber layer.

8. The composite part of claim 5, wherein a surface of the stepped section is coplanar with an outer surface of the first section of the reinforced fiber layer.

9. The composite part of claim 1, wherein the first metal plate further comprises a hem section in contact with the fold.

10. The composite part of claim 9, wherein the hem section is formed by rolling an end of the metal plate.

11. The composite part of claim 1, wherein the metal plate further comprises a bent section in contact with the first fold and bent towards the first section of the reinforced fiber layer.

12. The composite part of claim 1, wherein the reinforced fiber layer further comprises:
a first extended section extending from an end of the second section;
a second extended section having an inner surface facing an inner surface of the first extended section; and
a second fold connecting the first and second extended sections.

13. The composite part of claim 12, further comprising a second metal plate, wherein the second metal plate is inserted into the reinforced fiber layer such that the second metal plate is covered by the first and second extended sections and the second fold, and wherein the first extended section further comprises a second connection hole exposing a section of the second metal plate.

* * * * *